United States Patent [19]

Steiner et al.

[11] 4,103,902
[45] Aug. 1, 1978

[54] WATER SEAL FOR REGENERATOR

[75] Inventors: Peter Steiner, Edison; William Frederick Bischoff, Califon, both of N.J.

[73] Assignee: Foster Wheeler Energy Corporation, Livingston, N.J.

[21] Appl. No.: 825,122

[22] Filed: Aug. 16, 1977

[51] Int. Cl.² ............................ B01J 8/08; F16J 15/40
[52] U.S. Cl. ..................................... 277/12; 423/244; 55/77; 55/208; 209/11; 277/56; 277/135
[58] Field of Search ...................... 55/208, 77; 209/11, 209/235, 270, 273; 277/14 R, 14 V, 12, 56, 135; 423/244

[56] References Cited

U.S. PATENT DOCUMENTS

| 2,750,420 | 6/1956 | Hepp | 55/77 X |
|---|---|---|---|
| 2,875,844 | 3/1959 | Pring | 55/77 |
| 2,954,244 | 9/1960 | Austin | 277/135 R |
| 2,992,065 | 7/1961 | Feustel et al. | 423/244 |
| 3,398,509 | 8/1968 | Tamura et al. | 55/77 X |
| 3,405,508 | 10/1968 | Peters et al. | 55/73 |
| 3,511,027 | 5/1970 | Roberts et al. | 55/73 X |
| 3,862,295 | 1/1975 | Tolles | 423/244 |
| 3,910,041 | 10/1975 | Gibson | 277/135 R X |
| 3,913,253 | 10/1975 | Juntgen et al. | 423/244 |
| 4,017,422 | 4/1977 | Gappa et al. | 55/77 X |

FOREIGN PATENT DOCUMENTS 1,233,487  5/1971  United Kingdom ............... 277/135 R Primary Examiner—Robert S. Ward, Jr.
Attorney, Agent, or Firm—Marvin A. Naigur; John E. Wilson

[57] ABSTRACT

A water sealing device for establishing a gas-tight seal between a stationary member and a vibratory member in which a water tank is supported upon and moves with the vibratory member, and at least one sealing element is supported upon the stationary member and extends below the water level in the tank. Means are provided for regulating the level of water in the tank. A material flow passage extends through the water tank to interconnect the stationary and vibratory members.

4 Claims, 3 Drawing Figures

WATER SEAL FOR REGENERATOR

BACKGROUND OF THE INVENTION

This invention relates generally to sealing means and, more particularly, to a device for providing a water seal between a stationary and a vibrating body.

In the field of atmospheric pollution control, it is known to use an adsorptive process for the desulfurization of flue gas in which the sulfur-containing material is adsorbed in the porous system of a carbonaceous adsorbent material. The saturated adsorbent material, which is a material called char and is commonly in pellet form, is regenerated by a process in which the sulfur-containing material is chemically changed in form, such as the decomposition of sulfuric acid to sulfur dioxide, carbon dioxide and water. The regeneration of the saturated char can be accomplished by washing (wet regeneration) or by contacting it with hot sand (thermal regeneration). Wet regeneration produces dilute sulfuric acid (18% by weight) as a by-product, and because of the limited use for this by-product, thermal regeneration is the more practical method.

In thermal regeneration, an enclosed, refractory-lined vessel is normally utilized to contact the saturated char pellets with hot sand, which has been heated to a predetermined elevated temperature to act as an inert heat-transfer media. As the char pellets become heated, the reactions that occurred during the adsorption process are reversed, producing a concentrated stream of sulfur dioxide, water, carbon dioxide, and nitrogen.

In these type arrangements the mixture of hot sand and char flows slowly down through the regeneration vessel, with the flow being controlled by a char-sand separator/feeder positioned below the discharge hopper of the vessel. The char-sand separator/feeder not only controls the flow rate of the materials through the regeneration vessel, but also acts to separate these two materials after regeneration has taken place. The char pellets are separated, subsequently cooled, and returned to the adsorber for reuse, and the sand passes through a screen in the separator/feeder and is returned to a sand heater, which restores the heat lost to the char during the regeneration process and recycles the reheated sand to the top of the regeneration vessel.

Separation of the two materials is effected by vibration of the separator/feeder. The regeneration vessel, of course, is stationarily supported, and the by-products of the regeneration process are gaseous. Thus, it is essential that an effective, gas-tight seal be provided between the discharge hopper of the stationary regeneration vessel and the vibratory separator/feeder. This particular environment presents a set of unique problems since a suitable sealing device must be gas-tight, withstand high temperatures and vibrations, and be resistant to the abrasive effects of the sand-char mixture flowing from the hopper. Further, pressure differences exist between the regeneration vessel and the separator/feeder, which must be adequately accommodated by the sealing device.

Mechanical-type sealing devices, such as gaskets, flexible couplings, bellows, and the like, which may be made of metallic and/or elastomeric materials, are not totally satisfactory, since they do not provide all of the aforesaid desirable characteristics necessary for an effective, durable seal between the regeneration vessel and the vibratory separator/feeder.

SUMMARY OF THE INVENTION

Accordingly, it is an object of the present invention to provide an improved, gas-tight sealing device for use between a stationary structure and a vibratory structure.

Another object of the present invention is to provide an improved water sealing device for use between a stationary and a vibratory structure, which is capable of withstanding high-temperatures and an abrasive environment.

Another object of the present invention is to provide an improved water sealing device for use between a stationary regeneration vessel and a vibratory char-sand separator/feeder to maintain an effective seal while adsorbing the vibrations caused by the operation of the separator/feeder.

A further object of the present invention is to provide an improved water sealing device for use between a stationary regeneration vessel and a vibratory char-sand separator/feeder which is capable of accommodating pressure variations within and maintaining an air-tight relationship between these structures.

Yet another object of the present invention is to provide an improved water sealing device for use between a stationary regeneration vessel and a vibratory separator/feeder which is capable of limiting the maximum vacuum or pressure that can be developed in either of these structures.

Towards the fulfillment of these and other objects, a water sealing device is provided between the discharge hopper of a regeneration vessel and a vibratory separator/feeder to effect a gas-tight seal and to permit the unobstructed flow of a mixture of char and sand from the vessel to the separator/feeder. A discharge chute extending from the discharge hopper is concentrically disposed within a tubular conduit extending from the separator/feeder to form a flow path, and an annular water tank is affixed to and movable with the tubular conduit. A cylindrical member is attached at one end to the discharge chute by an annular flange, and the other end extends into the water tank to form a substantially-closed volume between the flange and the surface of the water in the tank. The free, relative displacement of the cylindrical member within the water tank permits vibratory motion of the separator/feeder while still maintaining an effective, gas-tight seal between the discharge hopper and the separator/feeder. Variations in pressure within the vessel or the separator/feeder can be readily accommodated, and means are provided to regulate the water level within the tank. Additional cylindrical members may be concentrically positioned within the water tank if the operating pressures of the regeneration vessel and/or the separator/feeder require additional sealing capability.

BRIEF DESCRIPTION OF THE DRAWINGS

The above description, as well as further objects, features and advantages of the present invention, will be more fully appreciated by reference to the following description of presently-preferred but nonetheless illustrative embodiments in accordance with the present invention, when taken in connection with the accompanying drawings, wherein.

DESCRIPTION OF THE PREFERRED EMBODIMENTS

Figure 1:
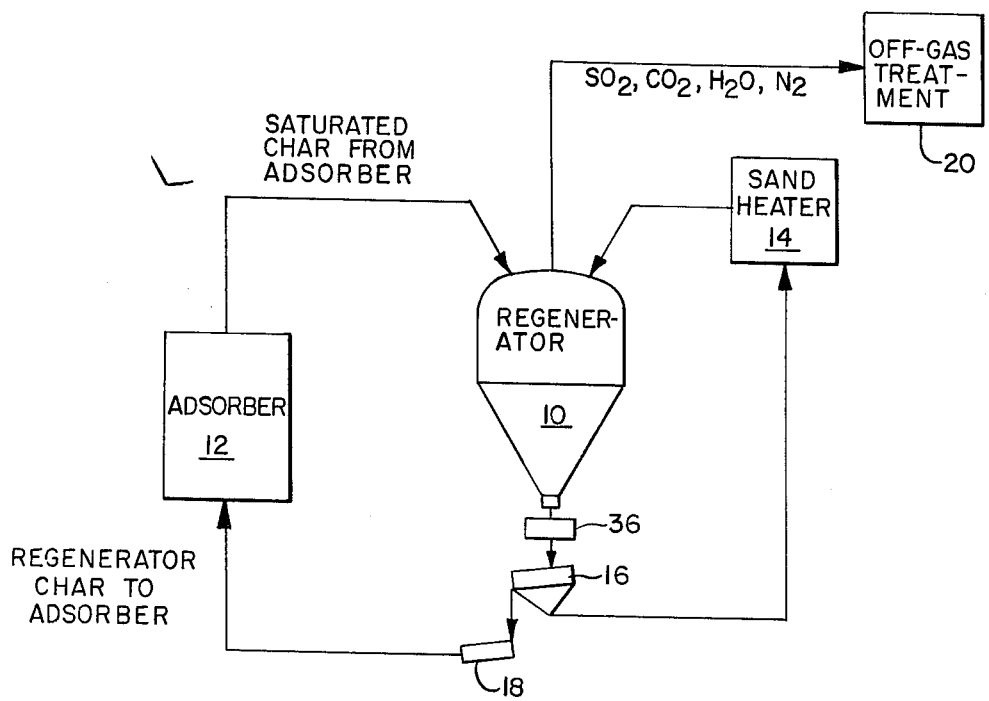
FIG. 1 is a schematic diagram showing the flow of materials to the regeneration portion of an adsorption system used for the desulfurization of flue gas.

Referring more particularly to FIG. 1 of the drawings, a regeneration vessel, designated generally by the reference character 10, is supplied with char from an adsorber 12 and heated sand from a sand heater 14. The char is saturated with sulfuric acid, nitrous oxide and particulate matter adsorbed during its flow through the adsorber 12. A char-sand feeder/separator 16 is disposed below the regeneration vessel 10 to receive the discharged mixture of char and sand and to separate these materials. The separated char is supplied to a char cooler 18, wherein the hot char pellets are cooled by known, conventional means, and is subsequently returned to the adsorber 12 for reuse. The sand passes through the char-sand feeder/separator 16 and is returned to the sand heater 14. The gaseous by-products from the regeneration of the saturated char are passed to an off-gas treatment facility 20 for suitable processing. It is understood that the passage of the materials to and from the above units can be achieved in a conventional manner.

Figure 2:
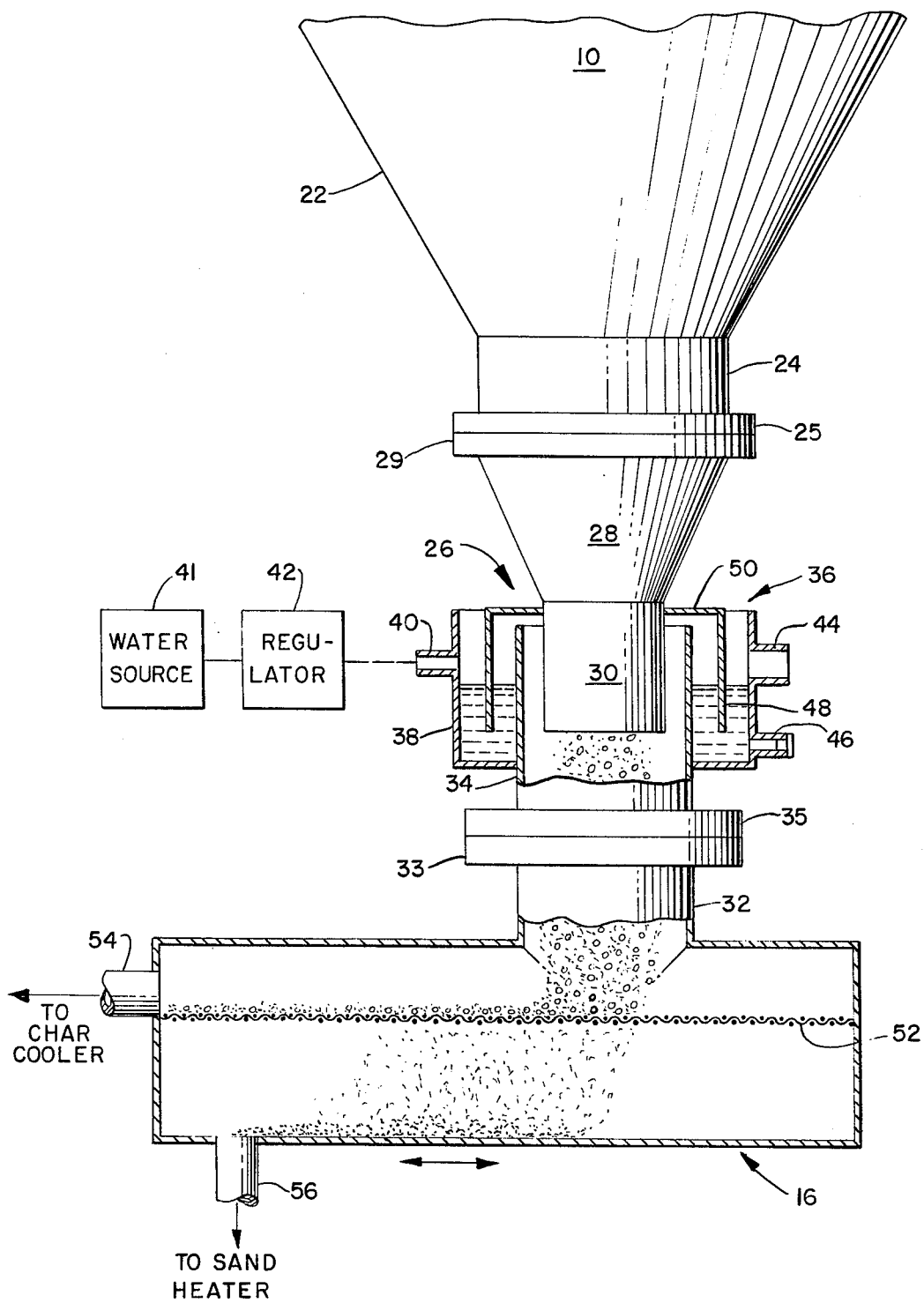
FIG. 2 is a partial elevational view, with some of the structure shown in section, of the water sealing device of the present invention interconnecting the regeneration vessel and the vibratory separator/feeder of the system shown in FIG. 1.

As shown in FIG. 2, the lower portion of the regeneration vessel 10 is formed into an inverted, conically-shaped hopper section 22, which directs the char-sand mixture into a discharge chute 24 extending below the hopper section. The lower extremity of the discharge chute 24 is provided with an annular flange 25. An adapter 26 cooperates with the different-diameter elements of the regeneration vessel 10 and the separator/feeder 16 to provide an unobstructed flow path for the char-sand mixture from the regeneration vessel to the separator/feeder. The adapter 26 includes a truncated, conical portion 28, an attachment flange 29 disposed on one end thereof to be secured to the annular flange 25 of the discharge chute 24 in a conventional manner, and a cylindrical extension member 30 disposed on the other end. The upper end of the conical portion 28 functions as the inlet of the adapter 26, and the lower end of the extension member 30 functions as the outlet. The inner surface of the adapter 26 may be lined with a protective, refractory-type material.

With continuing reference to FIG. 2, the separator/feeder 16 has an inlet 32 disposed below the discharge chute 24 for receiving the char-sand mixture from the discharge chute. The upper, open end of the inlet 32 is provided with a receiving flange 33. A vertically-extending inlet duct 34, provided with a mating flange 35 at its lower end, is coupled to the inlet 32 by the attachment of the mating flange to the receiving flange 33 of the inlet in a conventional manner. The inlet duct 34 has a larger diameter than the cylindrical extension member 30, such that the extension member is received within the inlet duct.

A water sealing device, designated generally by the reference character 36, includes an annular water tank 38 which is appropriately supported on the inlet duct 34 in a water-tight manner for movement therewith. The water tank 38 is provided with a water feed pipe 40 connected to a source of water 41 via a regulator 42, which senses the level of water in the water tank and operates in a known manner to shut off the water supply when a predetermined level is reached. The water tank 38 is also provided with an overflow pipe 44 for the discharge of excess water, and a drain 46, which is normally closed but which can be opened to completely drain the tank.

A cylindrical element 48 is attached to the extension member 30 of the adapter 26 by means of an annular ring 50, which is secured to and circumscribes the extension member. The cylindrical element 48 is supported by the annular ring 50 in such a fashion that the lower, open, end portion extends below the level of the water within the water tank 38 to provide a hydrostatic, or water, seal. Gases from the extension member 30 entering the enclosed air space defined between the surface of the water, the lower surface of the annular ring 50, the outer surface of the extension member 30 and the inner surface of the cylindrical element 48 cannot escape past this water seal.

The char-sand separator/feeder 16 is provided with a horizontally-disposed screen 52 of an appropriate mesh upon which is deposited the char-sand mixture from the discharge chute 24. Operating means (not shown) causes the separator/feeder to oscillate along its longitudinal axis, as shown by the arrows in FIG. 2, to impart longitudinal movement of the char-sand mixture and to separate the components thereof. Supported on a wall of the separator/feeder 16 is a removal conduit 54, which is positioned at substantially the horizontal elevation of the screen 52 for the removal of the separated char from the separator/feeder for passage to the char cooler 18. A sand discharge pipe 56 is disposed at a level below the screen 52 for the removal of the separated sand from the separator/feeder 16 to the sand heater 14 for reheating and recycling of the sand into the regeneration vessel 10.

In operation, the saturated char from the adsorber 12 and the heated sand from the sand heater 14 are introduced into the upper portion of the regeneration vessel 10 in a controlled manner via any suitable flow control means. The saturated char is directly mixed with the hot sand having a temperature in the range of 650° C to 728° C (1200° F to 1328° F), which results in a temperature of the mixture of 500°–600° C (932°–1202° F), depending upon the actual temperature of the incoming sand. The mixture of hot sand and hot char flows slowly and downwardly through the regeneration vessel 10 in ten or twenty minutes, and the flow of the mixture is controlled at the outlet of the adapter 26 by control of the speed of operation of the char-sand separator/feeder 16.

As stated above, the separator/feeder 16 is caused to oscillate in a longitudinal fashion, as indicated by the arrows in FIG. 2, by a conventional driving system (not shown). The mixture of char and sand flows from the hopper section 22 of the regeneration vessel 10, through the discharge chute 24 and the adapter 26, and then through the inlet duct 34 and into the inlet 32 of the separator/feeder 16, to be deposited upon the screen 52. The longitudinal oscillations of the separator/feeder 16 cause this mixture to move along the screen 52, with the smaller grains of sand falling through the screen into the lower portion of the separator/feeder. The larger-sized char pellets remain on the screen 52, and are subsequently discharged from the separator/feeder 16 via the conduit 54 and directed into the char cooler 18. The separated sand is removed via the discharge pipe 56 and is recycled through the sand heater 14 and into the regeneration vessel 10.

The water tank 38, attached to the separator/feeder 16 via the inlet duct 34 and the inlet 32, also oscillates. The cylindrical element 48, however, remains stationary with the ring 50, the adapter 26 and the discharge chute 24. The water sealing device 36 permits free, relative motion between the stationary, cylindrical element 48 and the side of the water tank 38 vibrating along with the separator/feeder 16. The hydrostatic pressure of the water within the tank 38 provides an effective, gas-tight seal to preclude escape of the gaseous by-products of the regeneration process.

Pressure variations within the regeneration vessel 10 and/or the separator/feeder 16 are compensated for by changes in the level of the water in the tank 38 while an air-tight relationship is constantly maintained between these structures. Additionally, the water seal limits the maximum pressure or vacuum that can be developed in either structure. For example, if excessive pressure is developed in either structure, the water within the tank 38 is discharged, breaking the water seal, and connecting both structures with the ambient environment to release the excess pressure. Once the excessive pressure condition has been relieved, the regulator 42 senses the low-water level condition and operates to open the flow of water through the inlet pipe 40 to automatically re-establish the water seal between the regeneration vessel 10 and the separator/feeder 16. The regulator 42 also functions to replace the water evaporated by the high temperatures involved in the regeneration process to maintain a substantially constant water level in the tank 38.

Figure 3:
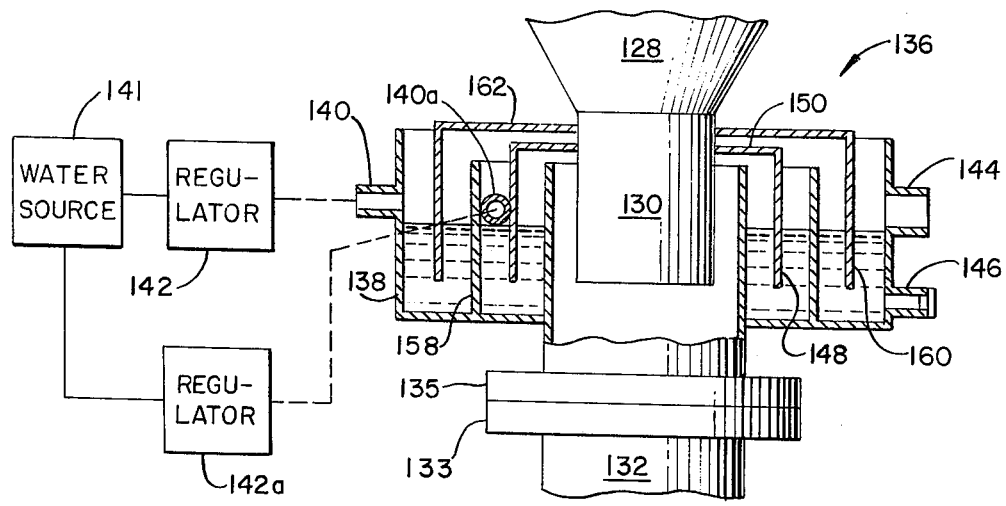
FIG. 3 is a partial view, similar to FIG. 2, of an alternate embodiment of the water sealing device shown in FIG. 2.

Shown in FIG. 3 is an alternate embodiment of the water sealing device of the present invention, in which corresponding parts have been designated by the same reference numerals as part of a "100" series. The water sealing device 136 includes water tanks 138 and 158 which are supplied with water by pipes 140 and 140a, respectively, from a source 141 via water-level regulators 142 and 142a, respectively. An overflow pipe 144 and a closable drain 146, which are structurally and functionally similar to the corresponding elements in the water sealing device 36 of FIG. 2, are also provided on the water tank 138. A first cylindrical element 148 is supported on a cylindrical extension member 130 by an annular ring 150, such that the lower, open end portion of the element 148 extends below the water level in the water tank 138.

Similarly, a second, concentrically-disposed element 160 is supported on the cylindrical extension member 130 by a second annular member 162 to permit the lower, open portion of the element 160 to extend below the level of the water in the water tank 158. In other words, the water sealing device 136 is provided with two, concentrically-disposed sealing elements 148 and 160, which function similarly. In operation, the water sealing device 136 functions in substantially the same manner as described for the water sealing device 36, with the device 136 being capable of withstanding greater operating pressures in the regeneration vessel 10 and in the separator/feeder 16 than the device 36.

The water sealing devices disclosed herein are superior to any mechanical sealing device, such as a flexible coupling of rubber, plastic or other resilient material, or bellows made of rubber, plastic or metal, since the material of mechanical sealing devices deteriorates rapidly in the high-temperature, vibratory environment of the regeneration vessel and the separator/feeder. The water sealing devices of the present invention do not have components which are susceptible to rapid deterioration as a result of vibrations or high temperatures. Also, the water level in the water tank, which may vary as a result of pressure and/or high temperatures, is automatically replenished to maintain a constant, effective gas-tight seal.

Although not particularly illustrated in the drawings, it is understood that all of the components described above are arranged and supported in an appropriate fashion to form a complete and operative system. Further, it is understood that all ancillary components, such as motors, pumps, fuel sources, etc., have not been specifically described, but such components are known in the art and would be appropriately incorporated into the operative system.

Of course, variations of the specific constructions and arrangement of the water sealing devices disclosed above can be made by those skilled in the art. For example, means other than an adapter may be provided between the regeneration vessel and the separator/feeder to ensure the free flow of the char-sand mixture between these structures. Other variations may be made in the foregoing without departing from the invention as defined in the appended claims.

What is claimed is:

1. In combination with a regeneration vessel for the thermal regeneration of an adsorbent material, means for introducing the saturated adsorbent material from an adsorption source into the vessel, means for introducing into the vessel a heated, inert material from a second source, a discharge means disposed adjacent to the exit portion of said vessel, and a vibratory separator means disposed adjacent to said discharge means for receiving the mixture of adsorbent and inert materials passing from said discharge means and for separating said materials, a device for establishing a fluid seal between said discharge means and said vibratory separator means which comprises:

a fluid container having a fluid therein and attached to and movable with said vibratory separator means;

sealing means having an open end portion and a closed end portion and supported upon said discharge means with said open end portion extending below the level of the fluid in said container, such that a hydrostatic seal is established within the enclosed volume defined by the internal volume of said sealing means and the surface of the fluid; and conduit means interconnecting said discharge means and said separator means to provide an unobstructed flow path for said materials.

2. The combination of claim 1, further including means to regulate the level of the fluid in said fluid container.

3. The combination of claim 2, wherein said regulating means includes:

a fluid level sensor;

supply means responsive to said sensor for supplying a fluid to said container; and outlet means for discharging excess fluid from said container.

4. The combination of claim 1, further including:

partition means in said fluid container to divide said container into at least two separate fluid-containing volumes; and said sealing means having at least two sealing elements supported upon said discharge means, with the open end portion of each element extending below the fluid level in each of said separate fluid-containing volumes.

* * * * *